(12) United States Patent
Georgescu et al.

(10) Patent No.: US 12,112,470 B2
(45) Date of Patent: Oct. 8, 2024

(54) PROBABILISTIC TREE TRACING AND LARGE VESSEL OCCLUSION DETECTION IN MEDICAL IMAGING

(71) Applicant: SIEMENS HEALTHINEERS AG, Forchheim (DE)

(72) Inventors: Bogdan Georgescu, Princeton, NJ (US); Eli Gibson, Plainsboro, NJ (US); Thomas Re, Monroe, NJ (US); Dorin Comaniciu, Princeton, NJ (US); Florin-Cristian Ghesu, Baiersdorf (DE); Vivek Singh, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 396 days.

(21) Appl. No.: 17/449,263

(22) Filed: Sep. 29, 2021

(65) Prior Publication Data

US 2023/0102246 A1     Mar. 30, 2023

(51) Int. Cl.
*G06N 3/08* (2023.01)
*G06T 7/00* (2017.01)
*G06T 7/143* (2017.01)

(52) U.S. Cl.
CPC ............ *G06T 7/0012* (2013.01); *G06T 7/143* (2017.01); *G06T 2207/20081* (2013.01); *G06T 2207/30101* (2013.01); *G06T 2207/30204* (2013.01)

(58) Field of Classification Search
CPC ........... A06K 9/6267; G06T 3/40; G06T 7/11; G06T 7/142; G06T 7/103; A61B 6/032; A61B 6/504; G16H 50/20
See application file for complete search history.

(56) References Cited

U.S. PATENT DOCUMENTS

| | | | |
|---|---|---|---|
| 10,373,313 B2 | 8/2019 | Ghesu et al. | |
| 10,582,907 B2 | 3/2020 | Chen et al. | |
| 10,643,105 B2 | 5/2020 | Georgescu et al. | |
| 2009/0003511 A1* | 1/2009 | Roy | A61B 5/415 378/4 |
| 2015/0269718 A1* | 9/2015 | Bhatia | G16H 30/40 382/128 |
| 2021/0374950 A1* | 12/2021 | Gao | G06V 20/653 |

OTHER PUBLICATIONS

Extended European Search Report (EESR) mailed Feb. 21, 2023 in corresponding European Patent Application No. 22198252.3.
Han, et al.; "Ordered multi-path propagation for vessel centerline extraction." Physics in Medicine & Biology 66.15 (2021): 155004.

(Continued)

*Primary Examiner* — Phuoc H Doan

(57) ABSTRACT

Systems and methods for generating a probabilistic tree of vessels are provided. An input medical image of vessels of a patient is received. Anatomical landmarks are identified in the input medical image. A centerline of the vessels in the input medical image is determined based on the anatomical landmarks. A probabilistic tree of the vessels is generated based on a probability of fit of the anatomical landmarks and the centerline of the vessels. The probabilistic tree of the vessels is output.

20 Claims, 13 Drawing Sheets

(56) References Cited

OTHER PUBLICATIONS

Araujo, et al.; "Topological Similarity Index and Loss Function for Blood Vessel Segmentation", arxiv.org, Cornell University Library, 201 Olin Library Cornell University Ithaca, NY 14853, Jul. 30, 2021.
Cootes et al., "Active shape models—their training and application," 1995, Computer Vision and Image Understanding vol. 61, Issue 1, pp. 38-59.
Lesage et al., "A review of 3D vessel lumen segmentation techniques: Models, features and extraction schemes," 2009, Medical Image Analysis, vol. 13, Issue 6, pp. 819-845.
Zhao et al., "Segmentation of blood vessels using rule-based and machine-learning-based methods: a review," 2019, Multimedia System, vol. 25, pp. 109-118.
Fu et al., "Rapid vessel segmentation and reconstruction of head and neck angiograms using 3D convolutional neural network," 2020, Nature Communication, vol. 11, Article No. 4829, 12 pgs.
Tetteh et al., "DeepVesselNet: Vessel Segmentation, Centerline Prediction, and Bifurcation Detection in 3-D Angiographic Volumes," 2020, Frontiers in Neuroscience vol. 14, 17 pgs.
Livne et al., "A U-Net deep learning framework for high performance vessel segmentation in patients with cerebrovascular disease," 2019, Frontiers in neuroscience vol. 13, 13 pgs.
Amukotuwa et al., "Automated Detection of Intracranial Large Vessel Occlusions on Computed Tomography Angiography," 2019, Stroke, vol. 50, Issue 10, pp. 2790-2798.
Ghesu et al., "Multi-Scale Deep Reinforcement Learning for Real-Time 3D-Landmark Detection in CT Scans," 2019, IEEE Transactions on Pattern Analysis and Machine Intelligence, vol. 41, No. 1, pp. 176-189.
Yang et al., "Automatic Liver Segmentation Using an Adversarial Image-to-Image Network," 2017, International Conference on Medical Image Computing and Computer-Assisted Intervention, Springer. pp. 507-515.
Liu et al., "Rivulet: 3D Neuron Morphology Tracing with Iterative Back-Tracking," 2016, Neuroinformatics vol. 14, pp. 387-401.
Nguyen et al., "Deep Reinforcement Learning for Multiagent Systems: A Review of Challenges, Solutions, and Applications," 2020, IEEE Transactions on Cybernetics, vol. 50, No. 9, pp. 3826-3839.
Itu et al., "A machine-learning approach for computation of fractional flow reserve from coronary computed tomography," 2016, Journal of Applied Physiology vol. 121.1, pp. 42-52.
Deshpande et al., "Automatic segmentation, feature extraction and comparison of healthy and stroke cerebral vasculature," 2021, NeuroImage: Clinical vol. 30, 11 pgs.
Cootes et al., "Statistical models of appearance for computer vision," 2004, 125 pgs.
Shi et al., "Unsupervised deep shape descriptor with point distribution learning," 2020, Proceedings of the IEEE/CVF Conference on Computer Vision and Pattern Recognition, pp. 9353-9362.
Park et al., "DeepSDF: Learning continuous signeddistance functions for shape representation," 2019, Proceedings of the IEEE/CVF Conference on Computer Vision and Pattern Recognition, pp. 165-174.
Bhalodia et al., "DeepSSM: A Deep Learning Framework for Statistical Shape Modeling from Raw Images," 2018, Shape in Medical Imaging, pp. 244-257.
Wu et al., "A Comprehensive Survey on Graph Neural Networks," 2021, IEEE Transactions on Neural Networks and Learning Systems, vol. 32, No. 1, pp. 4-24.
Jin et al., "Graph Structure Learning for Robust Graph Neural Networks," 2020, 26th ACM SIGKDD International Conference on Knowledge Discovery & Data Mining, pp. 66-74.

\* cited by examiner

FIG 5
502 — "Occlusion of the distal left M1/proximal left M2 segment with decreased distal arborization"
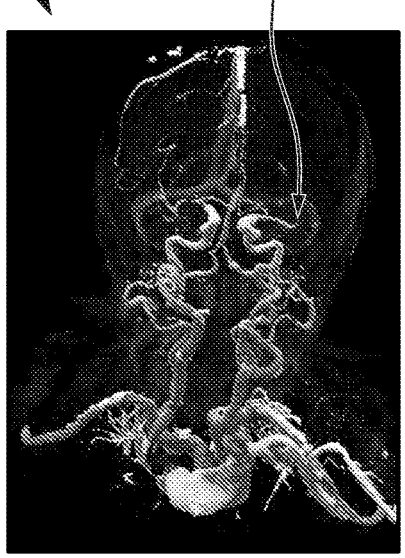
504 — "Occlusion of a right MCA M2 branch beyond the bifurcation"
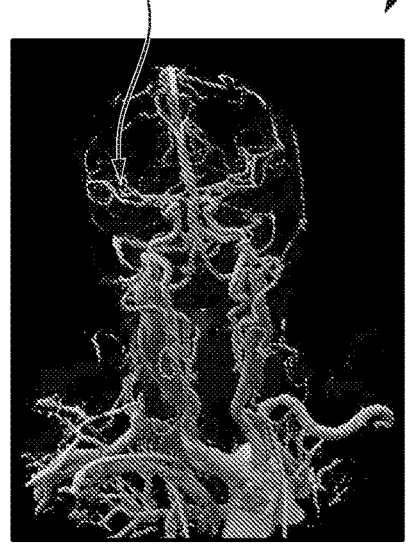
506
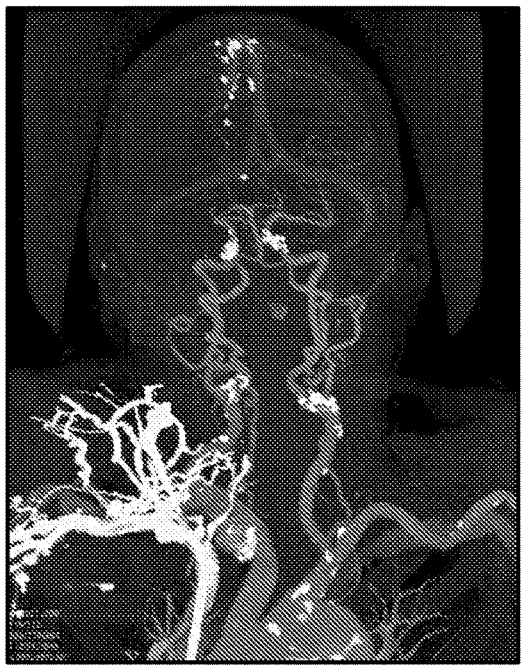
508 — +LVO Middle Cerebral Artery M1
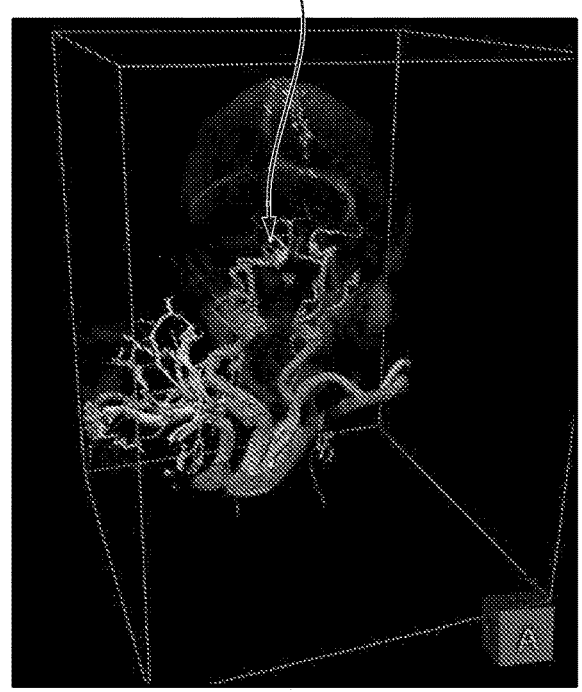

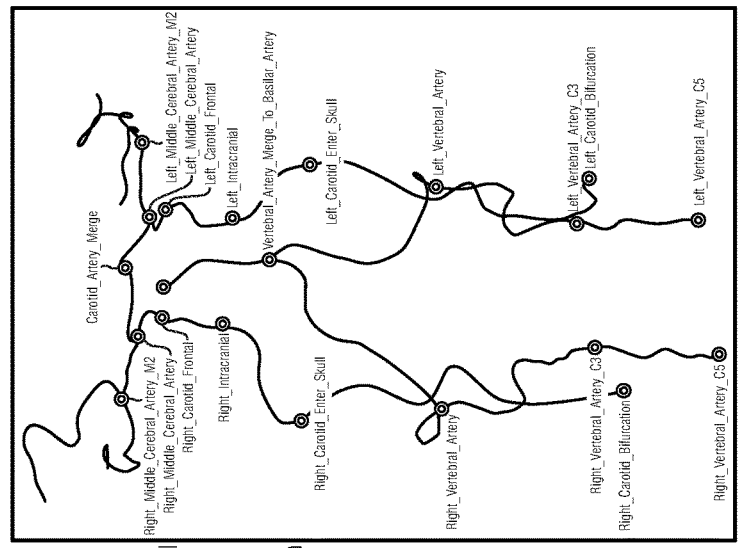
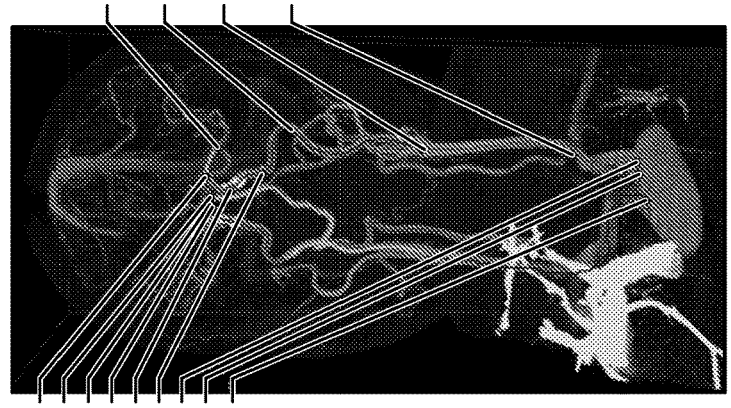
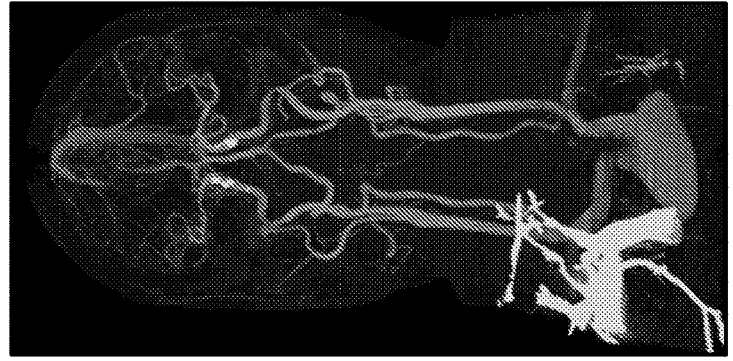
FIG 10

PROBABILISTIC TREE TRACING AND LARGE VESSEL OCCLUSION DETECTION IN MEDICAL IMAGING

TECHNICAL FIELD

The present invention relates generally to medical imaging analysis, and in particular to probabilistic tree tracing and large vessel occlusion detection in medical imaging.

BACKGROUND

A stroke occurs when the blood supply to a portion of the brain is interrupted or reduced, preventing brain tissue from receiving oxygen and nutrients. Timely treatment is important in the treatment of strokes. In the current stroke protocol, it is first determined whether the cause of the stroke is hemorrhagic or ischemic. If the cause of the stroke is ischemic, a CTA (computed tomography angiography) is performed to assess whether there are LVOs (large vessel occlusions) and/or significant obstructions of the main brain vessels.

AI (artificial intelligence) based approaches have been proposed for automatic interpretation of medical images to accelerate decision making and support intervention in the stroke protocol, thereby reducing time to treatment. However, such conventional AI based approaches for obtaining a continuous vessel segmentation have reduced robustness, especially in the presence of signal dropout, noise, vessel tortuosity, calcification, and proximity to bone or bifurcations. Further, such conventional AI based approaches for detecting LVOs are not able to identify the exact location of the occlusion within vessel distribution models.

BRIEF SUMMARY OF THE INVENTION

In accordance with one or more embodiments, systems and methods for generating a probabilistic tree of vessels are provided. An input medical image of vessels of a patient is received. Anatomical landmarks are identified in the input medical image. A centerline of the vessels in the input medical image is determined based on the anatomical landmarks. A probabilistic tree of the vessels is generated based on a probability of fit of the anatomical landmarks and the centerline of the vessels. The probabilistic tree of the vessels is output.

In one embodiment, a centerline of the vessels is determined as a centerline probability map of the centerline of the vessels. The probabilistic tree is generated by extracting centerline segments from the centerline probability map, generating candidate mappings between the centerline segments and anatomical landmarks to the probabilistic tree, calculating a score for each candidate mapping based on a probability of detection of the anatomical landmarks and the centerline segments and a probability of location of the anatomical landmarks and the centerline segments, and selecting one of the candidate mappings based on the scores.

In one embodiment, the probabilistic tree is generated by determining paths between the anatomical landmarks using RL (reinforcement learning) agents and generating the probabilistic tree based on a likelihood of the paths. Each of the RL agents is trained to navigate to a respective anatomical landmark based on geometric features and local image context features of the input medical image. One or more of the RL agents share the geometric features and the local image context features with connected RL agents. In one embodiment, an order for running the RL agents is determined using a meta-agent based on a configuration of the RL agents.

In one embodiment, the vessels are segmented from the input medical image based on the centerline of the vessels. Geometric indices of the vessels are computed based on the segmented vessels.

In one embodiment, a location of a large vessel occlusion is detected by identifying discontinuities in the probabilistic tree that result in missing downstream segments.

In one embodiment, the anatomical landmarks are identified in the input medical image using RL agents. Each of the RL agents is trained to navigate to a respective anatomical landmark based on geometric features and local image context features of the input medical image. One or more of the RL agents share the geometric features and the local image context features with connected RL agents. The geometric features may comprise one or more of relative position, relative distance, relative angle, current agent location confidence, or embedded image intensity features.

These and other advantages of the invention will be apparent to those of ordinary skill in the art by reference to the following detailed description and the accompanying drawings.

BRIEF DESCRIPTION OF THE DRAWINGS

FIG. 5 shows exemplary images of detected LVOs (large vessel occlusions), in accordance with one or more embodiments;

FIG. 10 shows an image of a probabilistic tree generated from input CTA (computed tomography angiography) medical image using the multi-scale reinforcement learning based model in accordance with embodiments described herein;

DETAILED DESCRIPTION

The present invention generally relates to methods and systems for probabilistic tree tracing and large vessel occlusion detection in medical imaging. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for probabilistic tree tracing and large vessel occlusion detection in medical imaging. Embodiments described herein use semantic knowledge of anatomical landmarks, combined with vessel centerlines identified using a trained deep learning model, to constrain and detect a semantic probabilistic representation of a vascular tree. Further, embodiments described herein use such semantic knowledge to automatically detect the presence of large vessel occlusions and compute geometric indices for intervention planning.

Figure 1:
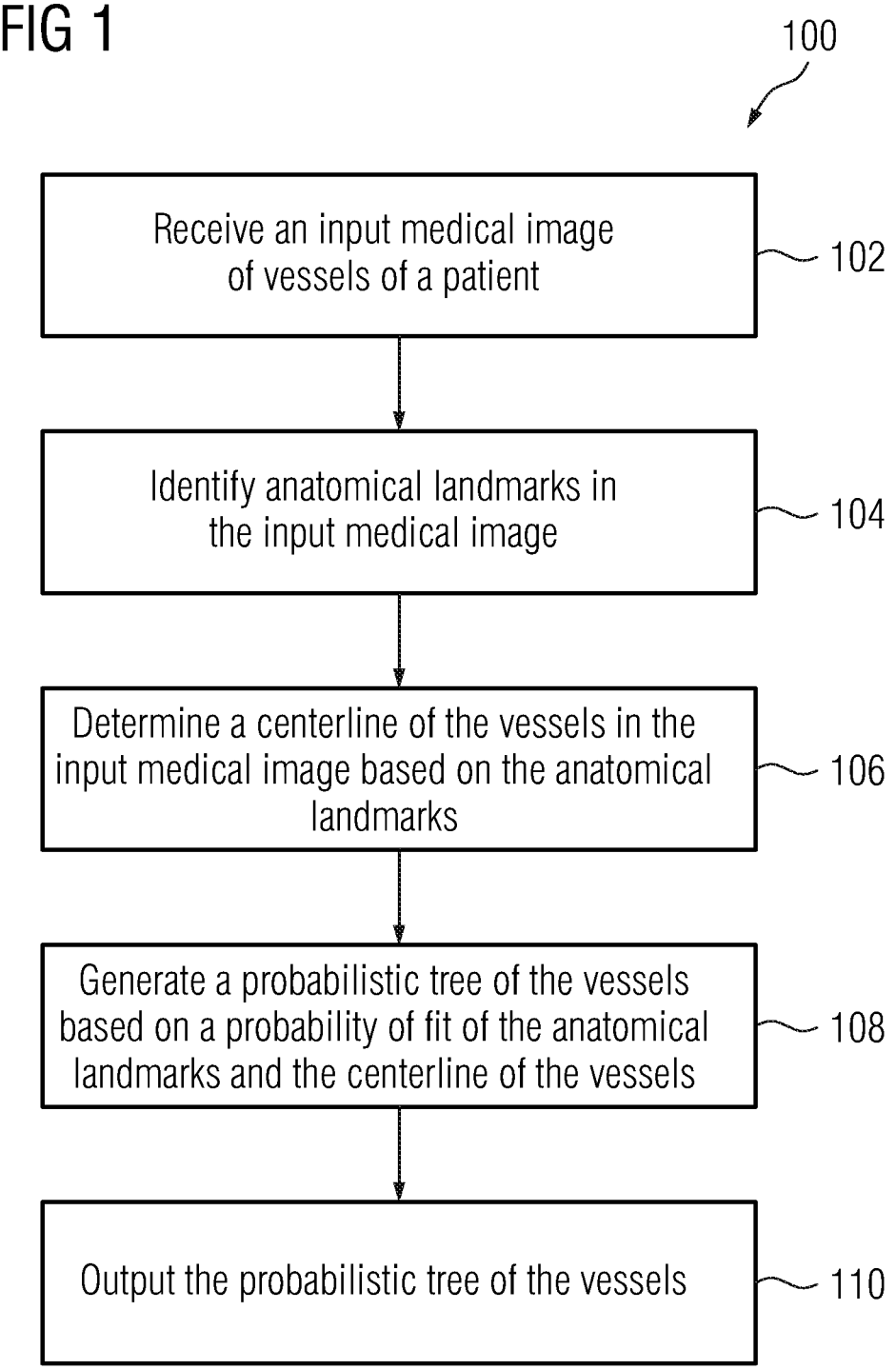
FIG. 1 shows a method for generating a probabilistic tree of vessels in an input medical image, in accordance with one or more embodiments.
Figure 2:
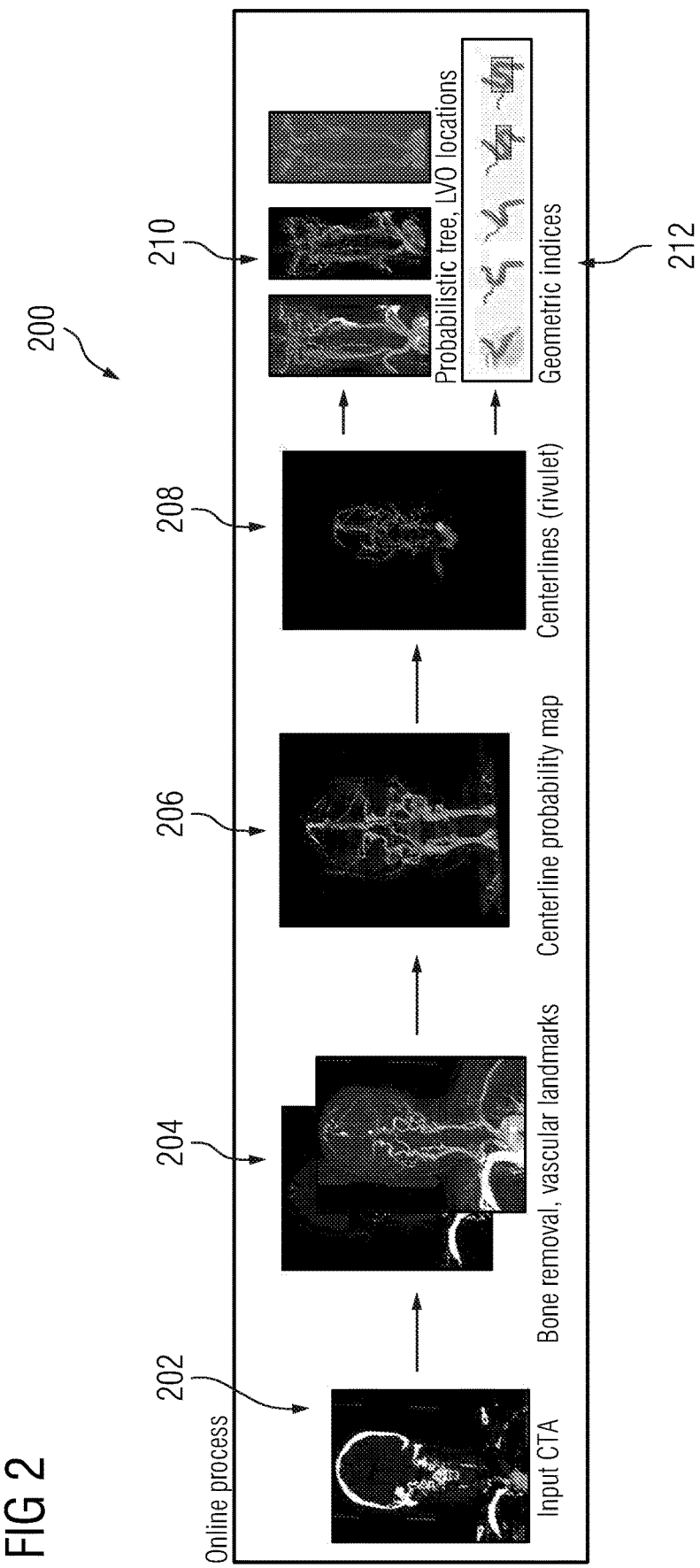
FIG. 2 shows a workflow of an online or inference processing stage for applying one or more trained machine learning networks for generating a probabilistic tree of vessels in an input medical image, in accordance with one or more embodiments.

FIG. 1 shows a method 100 for generating a probabilistic tree of vessels in an input medical image, in accordance with one or more embodiments. The steps of method 100 may be performed by one or more suitable computing devices, such as, e.g., computer 1302 of FIG. 13. FIG. 2 shows a workflow 200 of an online or inference processing stage for applying one or more trained machine learning networks for generating a probabilistic tree of vessels in an input medical image, in accordance with one or more embodiments. The one or more trained machine learning networks are trained during a prior offline or training processing stage, as described in further detail below with respect to FIG. 6. FIG. 1 and FIG. 2 will be described together.

At step 102 of FIG. 1, an input medical image of vessels of a patient is received. In one embodiment, the input medical image is a 3D (three dimensional) CTA (computed tomography angiography) volume. For example, the input medical image may be the input CTA volume received at step 202 of FIG. 2. However, the input medical image may be of any other suitable modality, such as, e.g., MRI (magnetic resonance imaging), ultrasound, x-ray, or any other medical imaging modality or combinations of medical imaging modalities. The input medical image may comprise 2D (two dimensional) images and/or 3D (three dimensional) volumes, and may comprise a single input medical image or a plurality of input medical images. The input medical image may be received directly from an image acquisition device, such as, e.g., a CT scanner, as the input medical image is acquired, or can be received by loading previously acquired medical images from a storage or memory of a computer system (e.g., a PACS (picture archiving and communication system)) or receiving medical images that have been transmitted from a remote computer system. It should be understood that reference herein to pixels of images equally refer to voxels of volumes (and vice versa).

Figure 3:
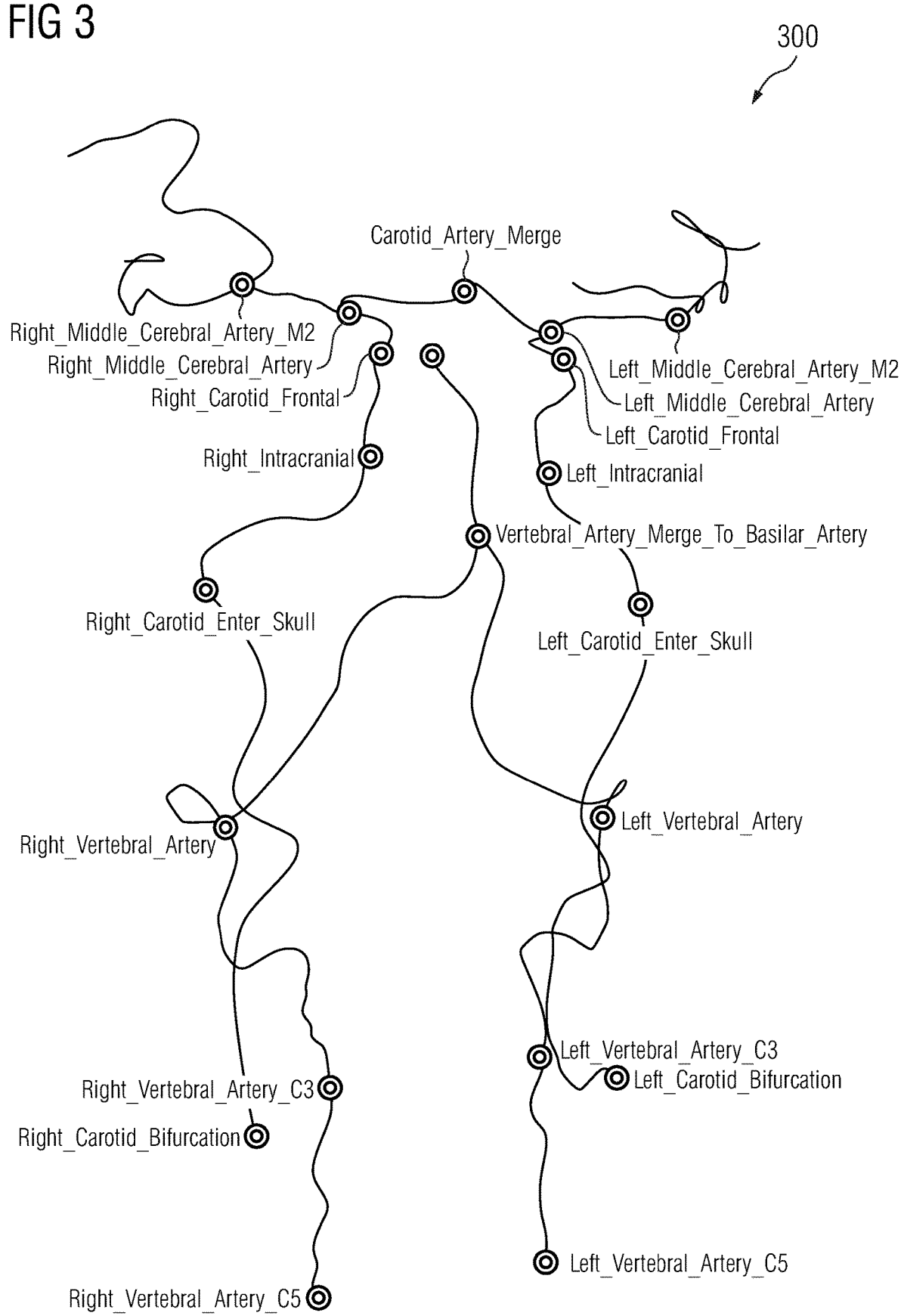
FIG. 3 shows exemplary anatomical landmarks in an image, in accordance with one or more embodiments.

At step 104 of FIG. 1, anatomical landmarks are identified in the input medical image. Exemplary anatomical landmarks are shown in image 300 of FIG. 3. In particular, image 300 shows exemplary anatomical landmarks for the right middle cerebral artery, the right middle cerebral artery M2, the left middle cerebral artery, the left middle cerebral artery M2, the carotid artery merge, the right carotid frontal, the left carotid frontal, the basilar artery, the right intracranial, the left intracranial, the right carotid enter skull, the left carotid enter skull, the vertebral artery merge to basilar artery, the right vertebral artery, the right vertebral artery C3, the right vertebral artery C5, the left vertebral artery, the left vertebral artery C3, the left vertebral artery C5, the right carotid bifurcation, and the left carotid bifurcation. In one embodiment, the anatomical landmarks are identified using a multi-scale reinforcement learning based model comprising AI (artificial intelligence) agents implemented with graph neural networks and trained with deep reinforcement learning, as described in further detail below with respect to FIG. 8. However, the anatomical landmarks may be identified using any other suitable approach.

In some embodiments, bone may also be removed from the input medical image. The bone may be removed from the input medical image using any suitable approach. In one embodiment, a machine learning based deep image-to-image model may be trained to remove the bone from the input medical image. In one example, bone removal and vascular landmark identification is performed on the input CTA volume at step 204 of FIG. 2.

At step 106 of FIG. 1, a centerline of the vessels in the input medical image is determined based on the anatomical landmarks. In one embodiment, the centerline of the vessels is determined as a centerline probability map. The centerline probability map defines a pixel-wise probability that a respective pixel depicts a centerline of a vessel. In one example, a centerline probability map is generated at step 208 of online processing stage 204 of FIG. 2.

In one embodiment, the centerline of the vessels is determined using a machine learning based model, such as, e.g., an image-to-image deep learning classifier. The image-to-image deep learning classifier receives as input the input medical image and the anatomical landmarks and generates as output a centerline probability map. The image-to-image deep learning classifier is trained during a prior offline or training stage, as described in further detail below with respect to FIG. 6. However, the centerline of the vessels may be determined using any other suitable approach.

At step 108 of FIG. 1, a probabilistic tree of the vessels is generated based on a probability of fit of the anatomical landmarks and the centerlines of the vessels. The probabilistic tree is a probabilistic or statistical representation of the tree of the vessels. In one embodiment, the probabilistic tree of the vessels may be generated based on a probability of fit of prior probabilistic trees as well.

In one embodiment, the probabilistic tree of the vessels is generated by combinatorial optimization. In this embodiment, centerline segments are extracted from the centerline probability map. In one example, a 3D rivulet method is applied to the centerline probability map to extract the centerline segments. For example, centerline segments are extracted by a 3D rivulet method at step 208 of FIG. 2 and a probabilistic tree is generated at step 210 of FIG. 2. In another example, the centerline segments can be extracted by running path tracing algorithms (e.g., dynamic programming) on the centerline probability map between two anatomical landmarks known to be connected. A combinatorial optimization problem is then solved by generating candidate mappings of the centerline segments and the anatomical landmarks to the probabilistic tree and measuring an overall probability score of the candidates. In one embodiment, the overall probability score is calculated as the probability of detection of the anatomical landmarks and the segments (from the classifier) added to the probability of the location of the anatomical landmarks and segments for an aligned probabilistic tree. A penalty term is included to account for missing anatomical landmarks and/or segments. One way to compute the overall probability score is with a weighted linear combination of the scores of the landmarks, scores of each centerline segment fit to the image, and the score of the landmarks and centerline segments fit to the offline trained probabilistic vascular tree. The score for the landmarks and centerlines fit to the image is given by the probability output by each landmark and centerline network detector at the target location. The weights for the linear combination and the penalty term for missing segments are trained to have maximum values at the correct fit.

In another embodiment, the probabilistic tree of the vessels is generated by reinforcement learning optimization. An RL (reinforcement learning) agent is trained for each respective segment with reinforcement learning to trace a path between anatomical landmarks based on one or more of the anatomical landmarks, the centerline probability map, the input medical image, or prior probabilistic trees of the vessels. The RL agents are trained to move along the path from an initial anatomical landmark to a target anatomical landmark by observing as input the centerline probability map and determining as output an action set in three dimensions (e.g., move left, right, up, down, back, forward, etc.) that will move the location of the RL agent closer towards the target anatomical landmark. A respective RL agent is applied for each target vascular path between vascular landmarks to determine the location of that vascular segment. A final tree is constructed by running all RL agents and determining the tree with the most likely probability. The tree will have as nodes the detected landmarks and as segments between the landmarks the most likely path taken by the RL agent (as trained).

In one embodiment, a meta-RL agent is trained to determine which RL agents should be run based on the current data to optimize the overall process. The meta-RL agent observes the overall configuration of RL agents, their current score, and/or other local agents features and selects which RL should act next based on the observations to achieve overall convergence. RL agents are further described below with respect to FIG. 8. Other multi-agent strategies can also be employed.

Figure 4:
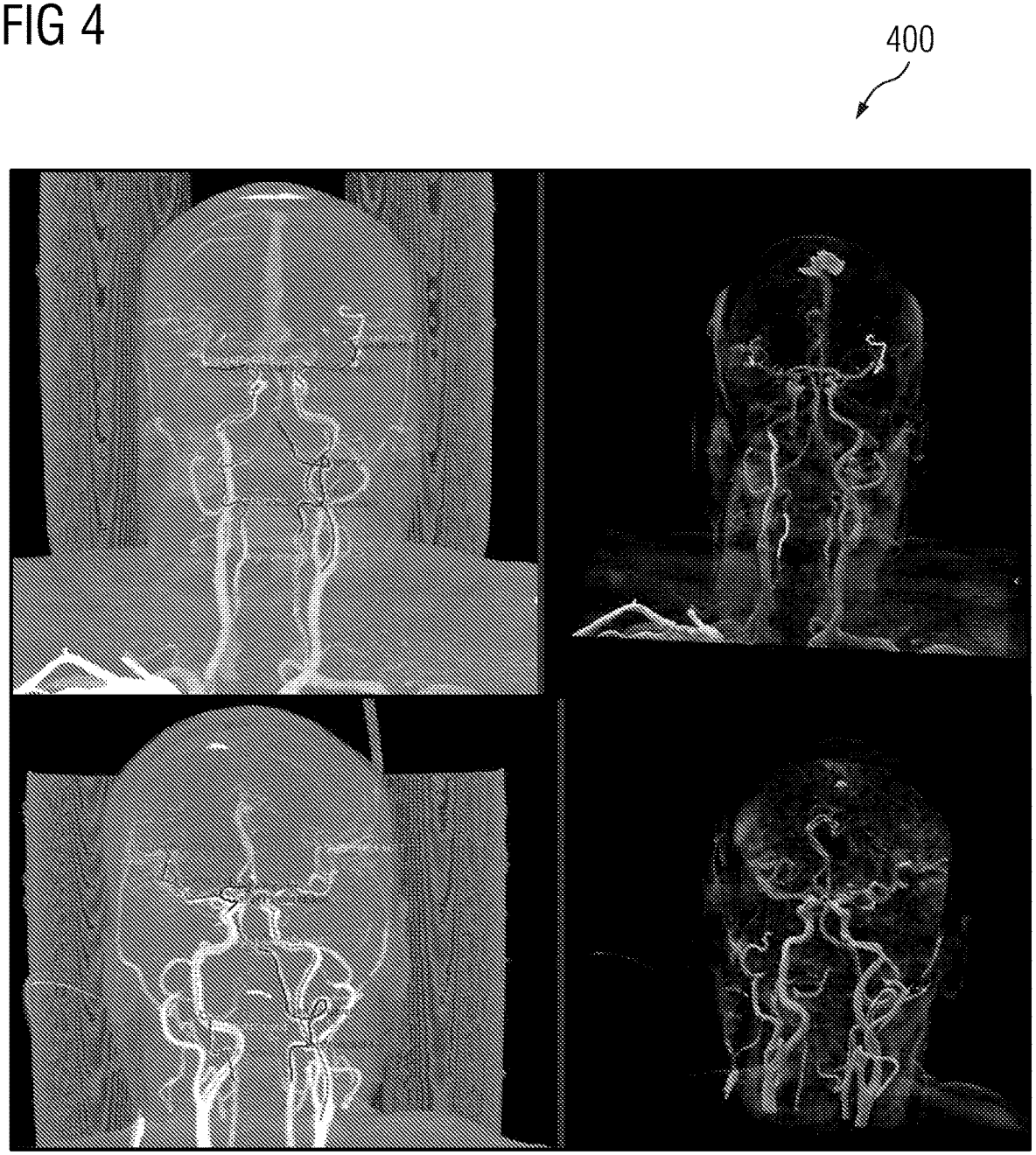
FIG. 4 shows exemplary images of probabilistic trees generated in accordance with embodiments described herein.

At step 110 of FIG. 1, the probabilistic tree of the vessels is output. For example, the probabilistic tree of the vessels can be output by displaying the probabilistic tree of the vessels on a display device of a computer system, storing the probabilistic tree of the vessels on a memory or storage of a computer system, or by transmitting the probabilistic tree of the vessels to a remote computer system. FIG. 4 shows exemplary images 400 of probabilistic trees generated according to method 100 of FIG. 1.

In one embodiment, geometric indices may be computed for intervention planning. For example, geometric indices may be computed at step 212 of FIG. 2. In this embodiment, vessels are segmented from the input medical image around the centerline of the vessels. The vessels may be segmented from the input medical image using, for example, a deep learning segmentation classifier. Geometric indices of the vessels are computed based on the segmented vessels and centerlines. Examples of geometric indices include lengths and counts of bifurcations, segments and paths; lumen diameters per segments; bifurcation angulations; and tortuosity indices such as elongation, sum of angles or inflection point count. The probabilistic tree can be used to augment geometric indices with confidence intervals.

In one embodiment, LVOs (large vessel occlusions) may be detected in the vessels based on the probabilistic tree, the segments of the vessels, and the centerline of the vessels. The location of LVOs can be detected by identifying abrupt discontinuities along the probabilistic tree that result in missing downstream segments. In one embodiment, an additional deep learning classifier can also be applied to determine the LVO probability at the identified location. FIG. 5 shows exemplary images 500 of detected LVOs, in accordance with one or more embodiments. Image 502 shows a detected occlusion of the distal left M1 segment/proximal left M2 segment with decreased distal arborization. Image 504 shows a detected occlusion of a right MCA (middle cerebral artery) M2 branch beyond the bifurcation. Image 506 shows a maximum intensity projection of a volume (after bone removal for proper vessel visualization) with an obstruction on the right MCA branch. Image 508 shows the system detected LVO in the MCA M1 branch. The location of LVOs can be corroborated with an analysis of occlusion size and composition in NCCT (non-contrast CT) scans, DECT (delayed enhanced CT) scans, or PCCT (photon-counting CT) scans. LVO detection in accordance with embodiments described herein were experimentally validated on a database of 224 datasets (64 positives and 160 hard negatives—visually selected as potential LVOs), showing a sensitivity of 91% A and a specificity of 69%. Detection performance of the MCA (middle cerebral artery) bifurcation location has a mean of 1.5 mm (millimeters) for the left MCA and 1.3 mm for the right MCA.

Figure 6:
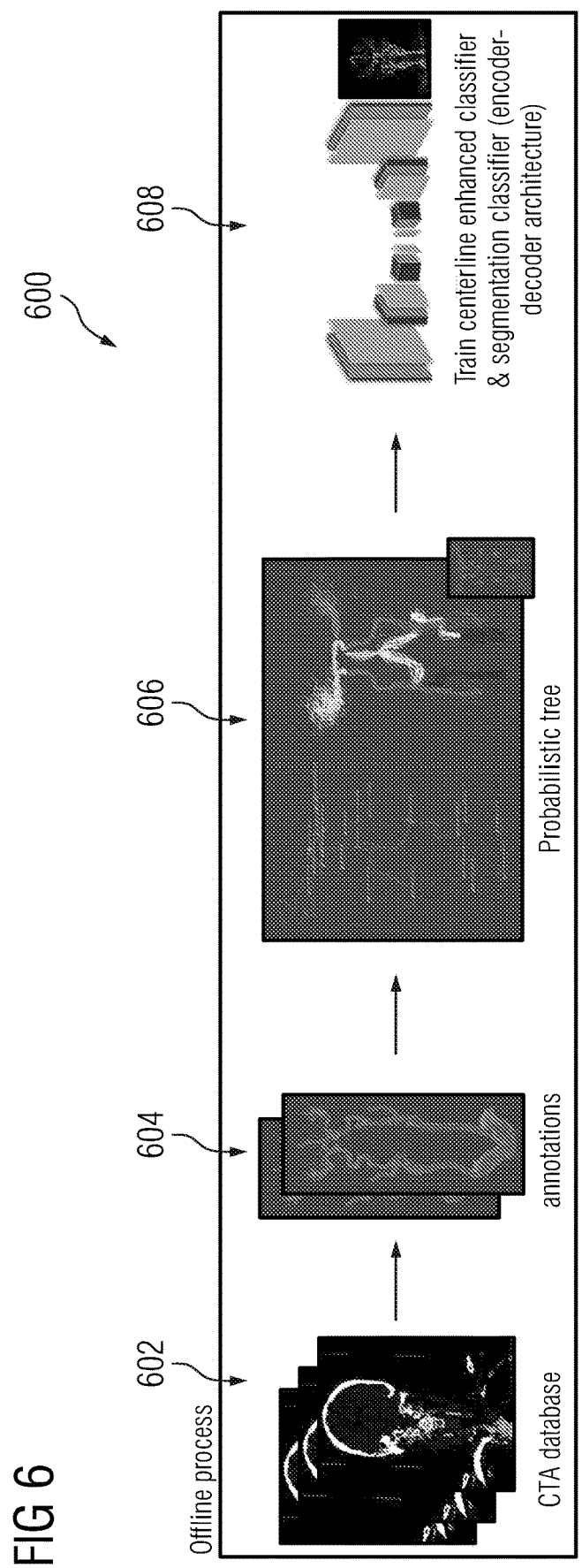
FIG. 6 shows a workflow of an offline or training processing stage for training one or more machine learning networks for generating a probabilistic tree of vessels from an input medical image, in accordance with one or more embodiments.

FIG. 6 shows a workflow 600 of an offline or training processing stage for training one or more machine learning networks for generating a probabilistic tree of vessels from an input medical image, in accordance with one or more embodiments. Once trained according to workflow 600, the one or more trained machine learning networks may be applied during an online or inference processing stage. In one example, workflow 600 is performed to train a multi-scale reinforcement learning based model, an image-to-image deep learning classifier and/or a deep learning segmentation classifier. Once trained, the trained multi-scale reinforcement learning based model may be applied to perform step 104 of FIG. 1 and step 202 of FIG. 2, the trained image-to-image deep learning classifier may be applied to perform step 106 of FIG. 1 and step 206 of FIG. 2 and the trained deep learning segmentation classifier may be applied to compute geometric indices in method 100 of FIG. 1 and perform step 212 of FIG. 2.

In workflow 600, at step 602, a database of CTA training images of vessels is maintained. At step 604, the CTA training images are annotated with segmentations of the arterial vasculature and anatomical landmarks. In some embodiments, centerlines of the vessels are also directly annotated on the CTA training images. Alternatively, the centerlines of the vessels may be extracted. At step 606, probabilistic trees are generated from the segmentations and the anatomical landmarks, e.g., using a parametric or a non-parametric probability distribution model. At step 608, one or more machine learning based networks are trained based on the annotated database of CTA training images and/or the probabilistic trees. In one example, a multi-scale reinforcement learning based model may be trained based on the annotated CTA training images to detect anatomical landmarks. In another example, an image-to-image deep learning classifier may be trained based on the annotated CTA training images to identify vessel centerlines by regressing a probability distribution output proportional to the distance to the centerline. In a further example, a deep learning segmentation classifier may be trained based on the annotated CTA training images to segment vessels only around the centerlines.

Figure 7:
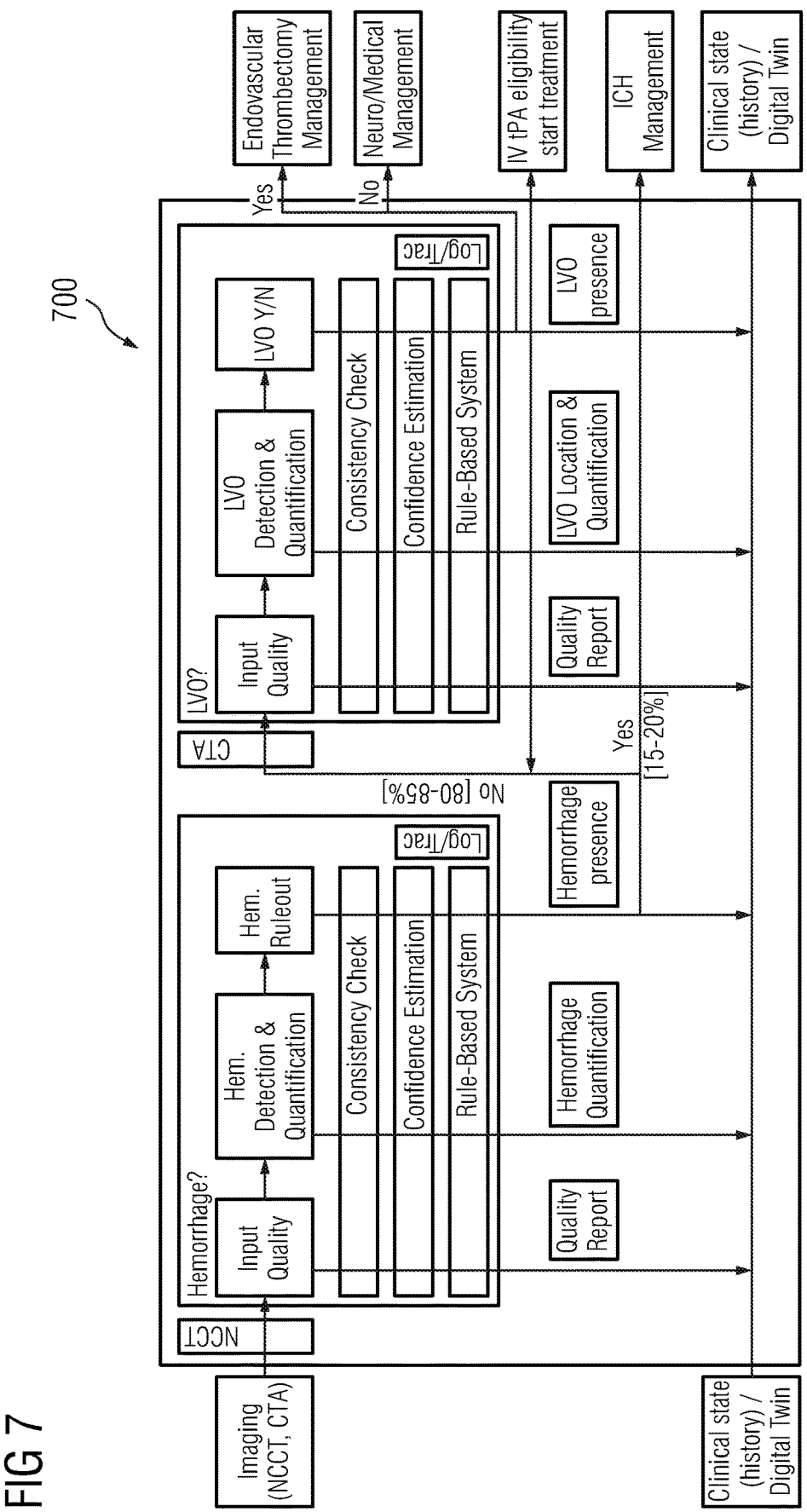
FIG. 7 shows a system view of an automated stroke management system, in accordance with one or more embodiments.

In one embodiment, embodiments described herein may be implemented in an automated stroke management system. FIG. 7 shows an exemplary system view 700 of an automated stroke management system, in accordance with one or more embodiments. Method 100 of FIG. 1 may be implemented in the automated stroke management system for analyzing input medical imaging and detecting LVOs and probabilistic trees for intervention planning. Based on the interpretation of the imaging (either directly on an imaging scanner or on any edge or computing device), automated decision making may be performed through worklist prioritization, automated notification, therapy selection (e.g. intravenous tissue-type plasminogen activator), and/or transferring the probabilistic tree knowledge to respective treatment (e.g., endovascular thrombectomy management).

Figure 8:
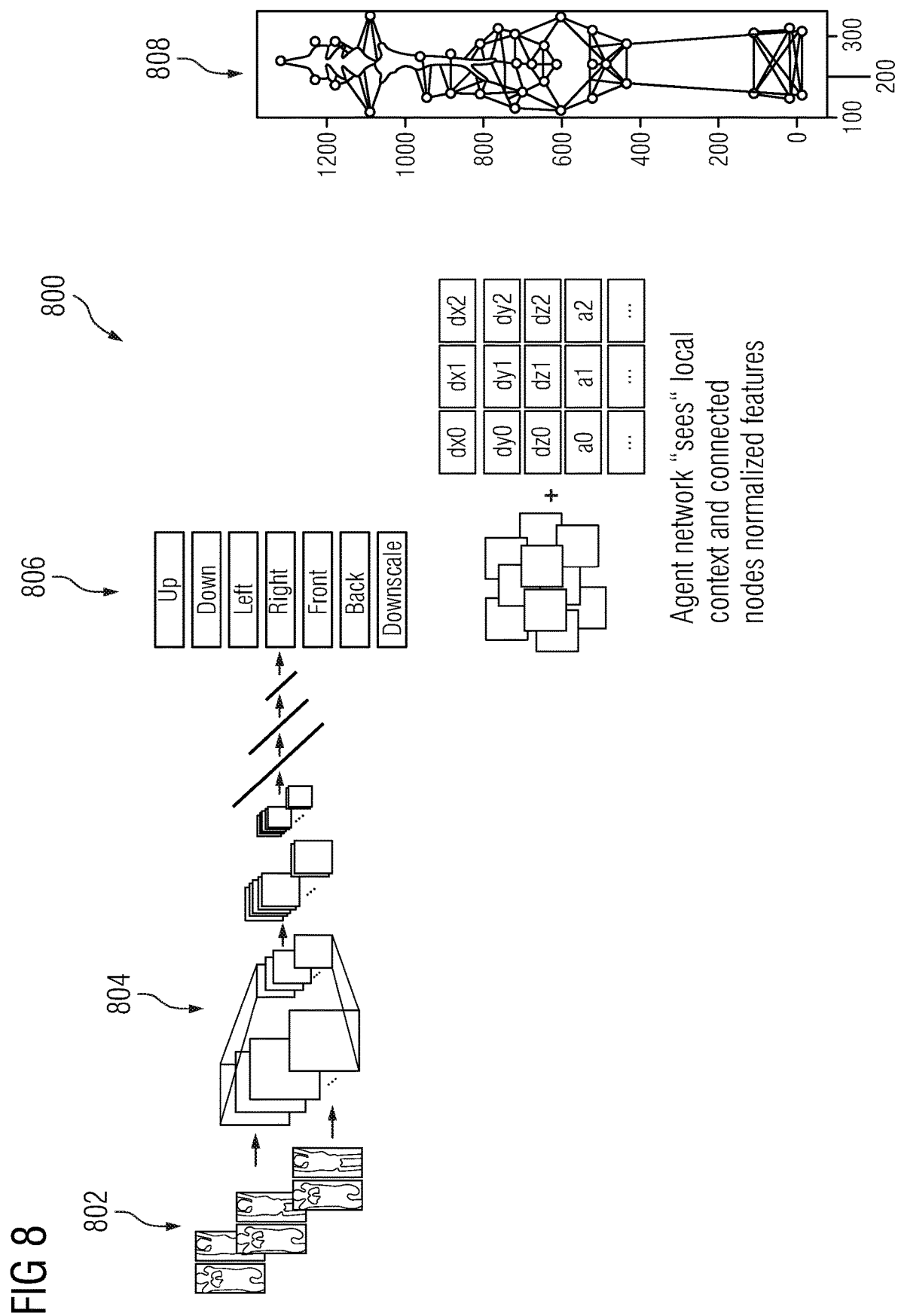
FIG. 8 shows a framework of a multi-scale reinforcement learning based model, in accordance with one or more embodiments.

FIG. 8 shows a framework 800 of a multi-scale reinforcement learning based model, in accordance with one or more embodiments. The multi-scale reinforcement learning model may be applied on the input medical image to perform step 104 of FIG. 1 and step 202 of FIG. 2. In the multi-scale reinforcement learning model, each RL agent is trained to navigate across images 802 of different image scales and dimensions to a respective target anatomical object. In contrast to conventional multi-scale deep reinforcement learning, the RL agents in accordance with embodiments described herein are implemented using graph neural networks to extract geometric features from the input medical image, along with local image context features. Local image context features are features that are derived from image/voxel intensities in the observed input patch. Geometric features are computed based on the xyz location in the image (from which one can derive relative position, distance and so on). Exemplary geometric features include relative position, relative distance (normalized by the global scale of the model) or relative angle, current agent location confidence, and embedded image intensity features.

Each RL agent may share features with other connected RL agents. The connected RL agents are identified by a connectivity graph 808. Connectivity graph 808 may be, for example, a predefined connectivity graph defined by a user or may be an exhaustive connectivity graph where each node connects with all other nodes. Each RL agent uses the extracted geometric features and local image context features, as well as shared features received from other connected RL agents, to learn a set of actions 806 to navigate from its current location to a location closer towards the target anatomical landmark using deep reinforcement learning. This is done using a deep neural network 804 to learn the probabilities of sets of actions. The sets of actions may include, for example, move up, move down, move left, move right, move to the front, move to the back, and stop.

The RL agents are jointly trained using geometric features and local image context features using, for example, deep q-learning, policy gradient, or actor-critic extended to multi-agent frameworks. At runtime, each RL agent starts from an expected location in the image and navigates in a synchronized manner. In one embodiment, a meta-agent is trained to coordinate the global application of the landmarks RL agents. For example, a meta-agent can be trained with the state space including the global positions on each landmark agent and an action space that include which RL agent should move next and/or a "teleport" action that will move a landmark RL agent position to one that is determined by all the other agents' position. The meta-agent can then be trained to optimally move the ensemble of the landmarks RL agents.

In one embodiment, a single RL agent is trained over one graph neural network where the output set of actions comprises which anatomical landmark to move to next. In one embodiment, graph structure learning is performed to determine which edges of the connectivity graph are important in passing features between RL agents. In one embodiment, the graph neural network may additionally have nodes that correspond to prior patient information, such as, e.g., age, gender, etc. Transmission of such prior patient information enables RL agents to develop search strategies that can account for image appearance variations. In one embodiment, the graph neural network may additionally have nodes that correspond to global patient information that can be estimated from image data and is not known a priori. For instance, a node corresponding to the height of a patient can be added and, via message passing, a posterior distribution on its value can be determined. When the nodes reach stationarity, the height should also converge to a stationary distribution. In one embodiment, multi-agent training with the graph neural network is performed where the set of actions include a "teleport" action to the location estimated by the current geometrical context.

Figure 9:
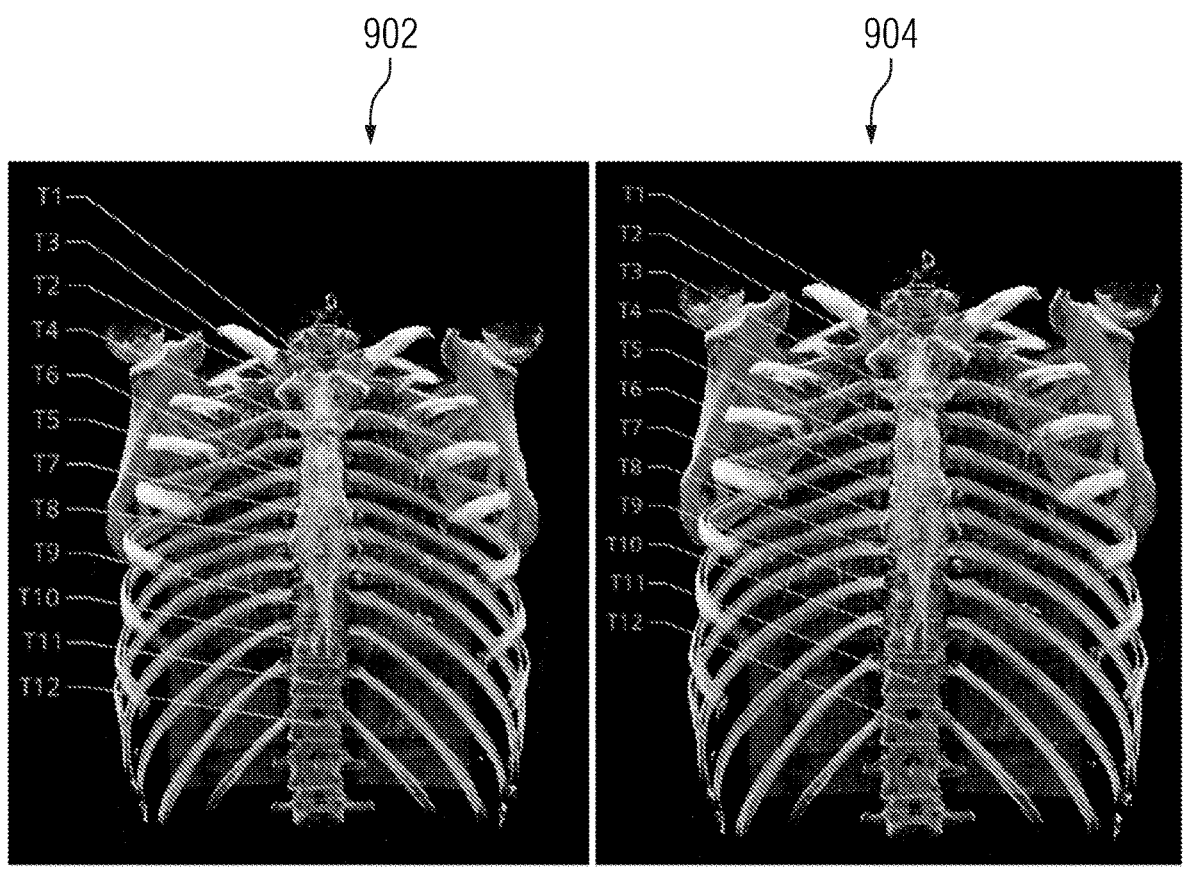
FIG. 9 shows a comparison of an image of vertebrae labeled using local image context features only and an image of vertebrae labeled using multi-scale reinforcement learning based model using geometric features and local image context features in accordance with embodiments described herein.

In one embodiment, the multi-scale reinforcement learning based model may be applied for spine labelling to determine the vertebrae labels in CT images. Local image context features alone are not sufficient to disambiguate between the vertebrae labels. Having information passed along RL agents would help to disambiguate between vertebrae labels. FIG. 9 shows a comparison of image 902 and 904. Image 902 is labeled using local image context features only. As can be seen, vertebrae T3 and T5 are mis-labelled in image 902. Image 904 is labeled using the multi-scale reinforcement learning based model using geometric features and local image context features, in accordance with embodiments described herein. Vertebrae labels are accurate in image 904.

In one embodiment, the multi-scale reinforcement learning based model may be applied for identifying anatomical landmarks (e.g., at step 104 of FIG. 1) and tracing vessel paths between anatomical landmarks in CTA images to generate a probabilistic tree (e.g., at step 108 of FIG. 1). The prior knowledge of the probabilistic tree can be used to determine the connectivity of the agents associated with the anatomical landmarks. In addition, RL agents can be trained to trace the trajectory between anatomical landmarks by determining a set of actions that would have them follow the vessel path. FIG. 10 shows an image 1004 of a probabilistic tree generated from input CTA medical image 1002 using the multi-scale reinforcement learning based model in accordance with embodiments described herein. Prior knowledge of the probabilistic tree in image 1006 is used to determine the connectivity of the RL agents associated with the anatomical landmarks.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 11:
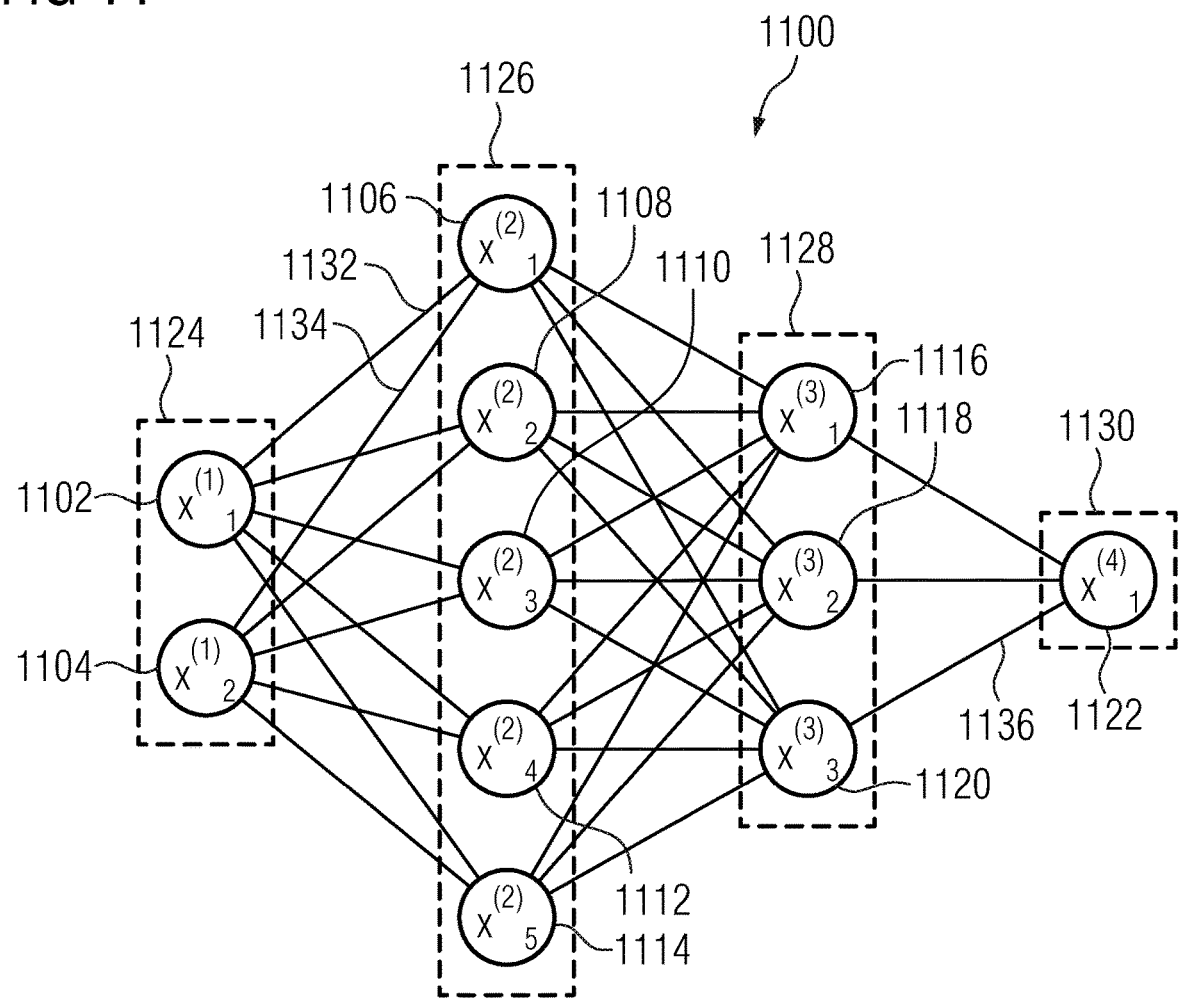
FIG. 11 shows an exemplary artificial neural network that may be used to implement one or more embodiments.

FIG. 11 shows an embodiment of an artificial neural network 1100, in accordance with one or more embodiments. Alternative terms for "artificial neural network" are "neural network", "artificial neural net" or "neural net". Machine learning networks described herein, such as, e.g., the machine learning based networks disclosed with respect to method 100 of FIG. 1, workflow 200 of FIG. 2, workflow 600 of FIG. 6 and framework 800 of FIG. 8, may be implemented using artificial neural network 1100.

The artificial neural network 1100 comprises nodes 1102-1122 and edges 1132, 1134, . . . , 1136, wherein each edge 1132, 1134, . . . , 1136 is a directed connection from a first node 1102-1122 to a second node 1102-1122. In general, the first node 1102-1122 and the second node 1102-1122 are different nodes 1102-1122, it is also possible that the first node 1102-1122 and the second node 1102-1122 are identical. For example, in FIG. 11, the edge 1132 is a directed connection from the node 1102 to the node 1106, and the edge 1134 is a directed connection from the node 1104 to the node 1106. An edge 1132, 1134, . . . , 1136 from a first node 1102-1122 to a second node 1102-1122 is also denoted as "ingoing edge" for the second node 1102-1122 and as "outgoing edge" for the first node 1102-1122.

In this embodiment, the nodes 1102-1122 of the artificial neural network 1100 can be arranged in layers 1124-1130, wherein the layers can comprise an intrinsic order introduced by the edges 1132, 1134, . . . , 1136 between the nodes 1102-1122. In particular, edges 1132, 1134, . . . , 1136 can exist only between neighboring layers of nodes. In the embodiment shown in FIG. 11, there is an input layer 1124 comprising only nodes 1102 and 1104 without an incoming edge, an output layer 1130 comprising only node 1122 without outgoing edges, and hidden layers 1126, 1128 in-between the input layer 1124 and the output layer 1130. In general, the number of hidden layers 1126, 1128 can be chosen arbitrarily. The number of nodes 1102 and 1104 within the input layer 1124 usually relates to the number of input values of the neural network 1100, and the number of nodes 1122 within the output layer 1130 usually relates to the number of output values of the neural network 1100.

In particular, a (real) number can be assigned as a value to every node 1102-1122 of the neural network 1100. Here, $x^{(n)}_i$ denotes the value of the i-th node 1102-1122 of the n-th layer 1124-1130. The values of the nodes 1102-1122 of the input layer 1124 are equivalent to the input values of the neural network 1100, the value of the node 1122 of the output layer 1130 is equivalent to the output value of the neural network 1100. Furthermore, each edge 1132, 1134, . . . , 1136 can comprise a weight being a real number, in particular, the weight is a real number within the interval [−1, 1] or within the interval [0, 1]. Here, $w^{(m,n)}_{i,j}$ denotes the weight of the edge between the i-th node 1102-1122 of the m-th layer 1124-1130 and the j-th node 1102-1122 of the n-th layer 1124-1130. Furthermore, the abbreviation $w^{(n)}_{i,j}$ is defined for the weight $w^{(n,n+1)}_{i,j}$.

In particular, to calculate the output values of the neural network 1100, the input values are propagated through the neural network. In particular, the values of the nodes 1102-1122 of the (n+1)-th layer 1124-1130 can be calculated based on the values of the nodes 1102-1122 of the n-th layer 1124-1130 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 1124 are given by the input of the neural network 1100, wherein values of the first hidden layer 1126 can be calculated based on the values of the input layer 1124 of the neural network, wherein values of the second hidden layer 1128 can be calculated based in the values of the first hidden layer 1126, etc.

In order to set the values $w^{(m,n)}_{i,j}$ for the edges, the neural network 1100 has to be trained using training data. In particular, training data comprises training input data and training output data (denoted as $t_i$). For a training step, the neural network 1100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1100 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 1130, wherein f' is the first derivative of the activation function, and $y^{(n+1)}_j$ is the comparison training value for the j-th node of the output layer 1130.

Figure 12:
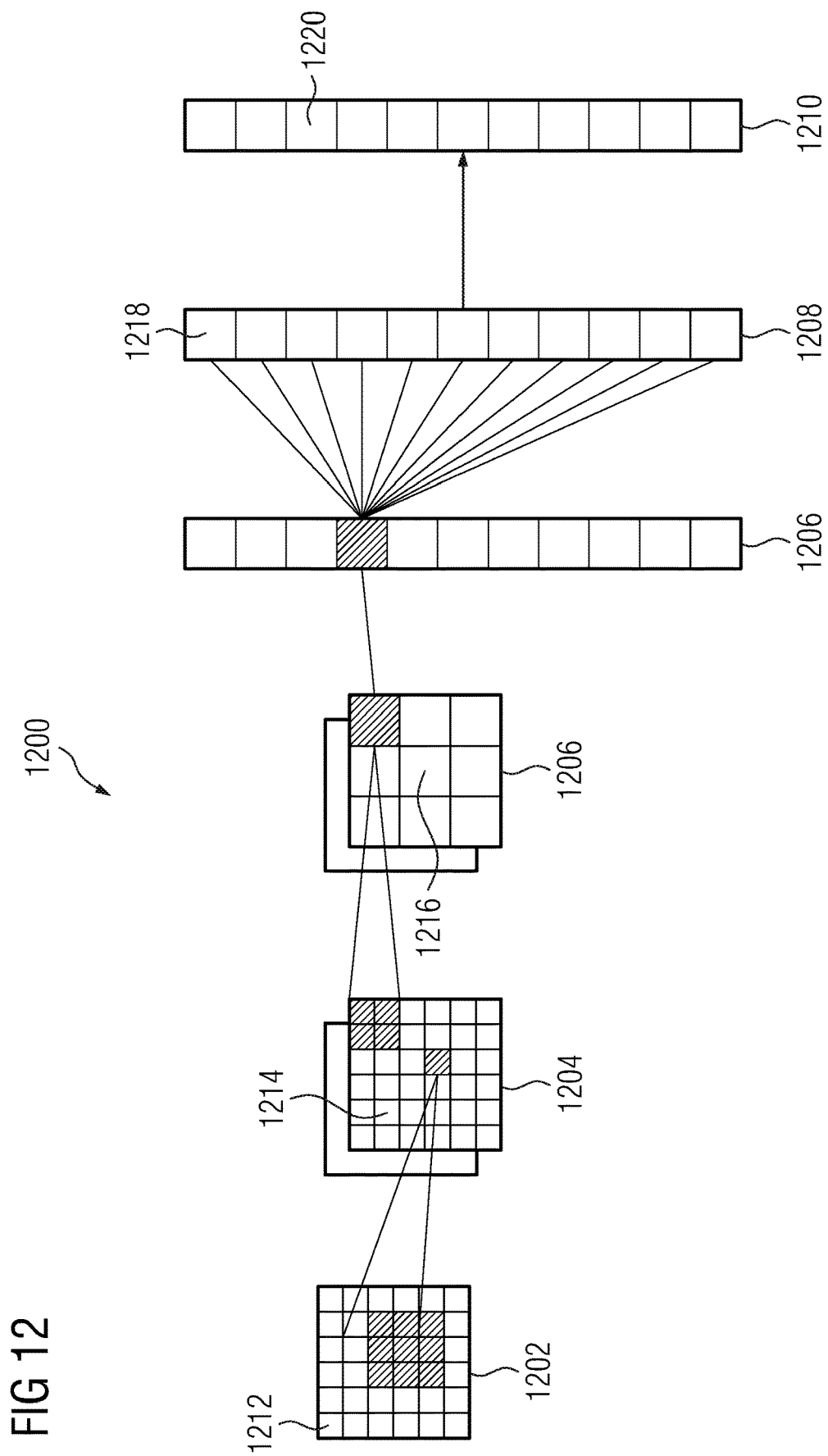
FIG. 12 shows a convolutional neural network that may be used to implement one or more embodiments.

FIG. 12 shows a convolutional neural network 1200, in accordance with one or more embodiments. Machine learning networks described herein, such as, e.g., the machine learning based networks disclosed with respect to method 100 of FIG. 1, workflow 200 of FIG. 2, workflow 600 of FIG. 6 and framework 800 of FIG. 8, may be implemented using convolutional neural network 1200.

In the embodiment shown in FIG. 12, the convolutional neural network comprises 1200 an input layer 1202, a convolutional layer 1204, a pooling layer 1206, a fully connected layer 1208, and an output layer 1210. Alternatively, the convolutional neural network 1200 can comprise several convolutional layers 1204, several pooling layers 1206, and several fully connected layers 1208, as well as other types of layers. The order of the layers can be chosen arbitrarily, usually fully connected layers 1208 are used as the last layers before the output layer 1210.

In particular, within a convolutional neural network 1200, the nodes 1212-1220 of one layer 1202-1210 can be considered to be arranged as a d-dimensional matrix or as a d-dimensional image. In particular, in the two-dimensional case the value of the node 1212-1220 indexed with i and j in the n-th layer 1202-1210 can be denoted as $x^{(n)}_{[i,j]}$. However, the arrangement of the nodes 1212-1220 of one layer 1202-1210 does not have an effect on the calculations executed within the convolutional neural network 1200 as such, since these are given solely by the structure and the weights of the edges.

In particular, a convolutional layer 1204 is characterized by the structure and the weights of the incoming edges forming a convolution operation based on a certain number of kernels. In particular, the structure and the weights of the incoming edges are chosen such that the values $x^{(n)}_k$ of the nodes 1214 of the convolutional layer 1204 are calculated as a convolution $x^{(n)}_k = K_k * x^{(n-1)}$ based on the values $x^{(n-1)}$ of the nodes 1212 of the preceding layer 1202, where the convolution * is defined in the two-dimensional case as $$x^{(n)}_k[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 1212-1218 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 1212-1220 in the respective layer 1202-1210. In particular, for a convolutional layer 1204, the number of nodes 1214 in the convolutional layer is equivalent to the number of nodes 1212 in the preceding layer 1202 multiplied with the number of kernels.

If the nodes 1212 of the preceding layer 1202 are arranged as a d-dimensional matrix, using a plurality of kernels can be interpreted as adding a further dimension (denoted as "depth" dimension), so that the nodes 1214 of the convolutional layer 1204 are arranged as a (d+1)-dimensional matrix. If the nodes 1212 of the preceding layer 1202 are already arranged as a (d+1)-dimensional matrix comprising a depth dimension, using a plurality of kernels can be interpreted as expanding along the depth dimension, so that the nodes 1214 of the convolutional layer 1204 are arranged also as a (d+1)-dimensional matrix, wherein the size of the (d+1)-dimensional matrix with respect to the depth dimension is by a factor of the number of kernels larger than in the preceding layer 1202.

The advantage of using convolutional layers 1204 is that spatially local correlation of the input data can be exploited by enforcing a local connectivity pattern between nodes of adjacent layers, in particular by each node being connected to only a small region of the nodes of the preceding layer.

In embodiment shown in FIG. 12, the input layer 1202 comprises 36 nodes 1212, arranged as a two-dimensional 6×6 matrix. The convolutional layer 1204 comprises 72 nodes 1214, arranged as two two-dimensional 6×6 matrices, each of the two matrices being the result of a convolution of the values of the input layer with a kernel. Equivalently, the nodes 1214 of the convolutional layer 1204 can be interpreted as arranges as a three-dimensional 6×6×2 matrix, wherein the last dimension is the depth dimension.

A pooling layer 1206 can be characterized by the structure and the weights of the incoming edges and the activation function of its nodes 1216 forming a pooling operation based on a non-linear pooling function f. For example, in the two dimensional case the values $x^{(n)}$ of the nodes 1216 of the pooling layer 1206 can be calculated based on the values $x^{(n-1)}$ of the nodes 1214 of the preceding layer 1204 as $$x^{(n)}[i,j] = f(x^{(n-1)}[id_1,jd_2], \ldots, x^{(n-1)}[id_1+d_1-1, jd_2+d_2-1])$$

In other words, by using a pooling layer 1206, the number of nodes 1214, 1216 can be reduced, by replacing a number d1·d2 of neighboring nodes 1214 in the preceding layer 1204 with a single node 1216 being calculated as a function of the values of said number of neighboring nodes in the pooling layer. In particular, the pooling function f can be the max-function, the average or the L2-Norm. In particular, for a pooling layer 1206 the weights of the incoming edges are fixed and are not modified by training.

The advantage of using a pooling layer 1206 is that the number of nodes 1214, 1216 and the number of parameters is reduced. This leads to the amount of computation in the network being reduced and to a control of overfitting.

In the embodiment shown in FIG. 12, the pooling layer 1206 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 1208 can be characterized by the fact that a majority, in particular, all edges between nodes 1216 of the previous layer 1206 and the nodes 1218 of the fully-connected layer 1208 are present, and wherein the weight of each of the edges can be adjusted individually.

In this embodiment, the nodes 1216 of the preceding layer 1206 of the fully-connected layer 1208 are displayed both as two-dimensional matrices, and additionally as non-related nodes (indicated as a line of nodes, wherein the number of nodes was reduced for a better presentability). In this embodiment, the number of nodes 1218 in the fully connected layer 1208 is equal to the number of nodes 1216 in the preceding layer 1206. Alternatively, the number of nodes 1216, 1218 can differ.

Furthermore, in this embodiment, the values of the nodes 1220 of the output layer 1210 are determined by applying the Softmax function onto the values of the nodes 1218 of the preceding layer 1208. By applying the Softmax function, the sum the values of all nodes 1220 of the output layer 1210 is 1, and all values of all nodes 1220 of the output layer are real numbers between 0 and 1.

A convolutional neural network 1200 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 1200 can be trained based on the backpropagation algorithm. For preventing overfitting, methods of regularization can be used, e.g. dropout of nodes 1212-1220, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1, 2, or 6. Certain steps or functions of the methods and workflows described herein, including one or more of the steps or functions of FIG. 1, 2, or 6, may be performed by a server or by another processor in a network-based cloud-computing system. Certain steps or functions of the methods and workflows described herein, including one or more of the steps of FIG. 1, 2, or 6, may be performed by a client computer in a network-based cloud computing system. The steps or functions of the methods and workflows described herein, including one or more of the steps of FIG. 1, 2, or 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1, 2, or 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
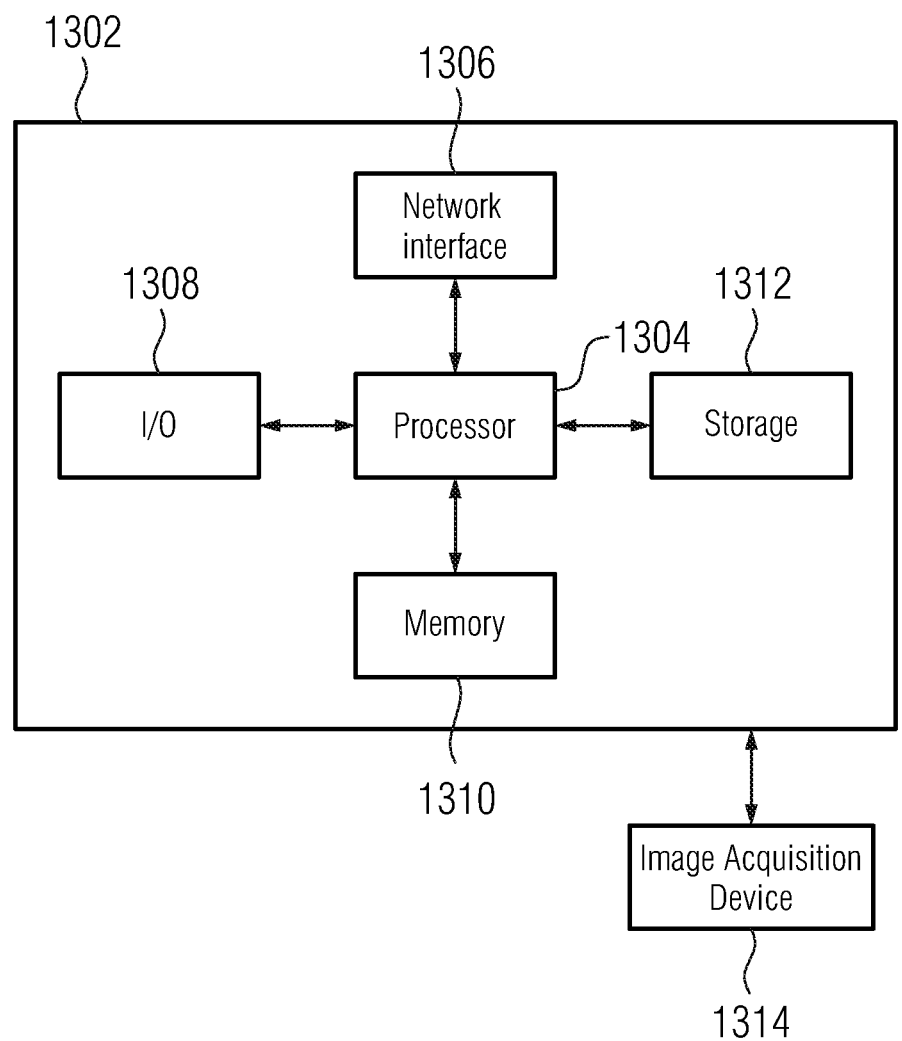
FIG. 13 shows a high-level block diagram of a computer that may be used to implement one or more embodiments.

A high-level block diagram of an example computer 1302 that may be used to implement systems, apparatus, and methods described herein is depicted in FIG. 13. Computer 1302 includes a processor 1304 operatively coupled to a data storage device 1312 and a memory 1310. Processor 1304 controls the overall operation of computer 1302 by executing computer program instructions that define such operations. The computer program instructions may be stored in data storage device 1312, or other computer readable medium, and loaded into memory 1310 when execution of the computer program instructions is desired. Thus, the method and workflow steps or functions of FIG. 1, 2, or 6 can be defined by the computer program instructions stored in memory 1310 and/or data storage device 1312 and controlled by processor 1304 executing the computer program instructions. For example, the computer program instructions can be implemented as computer executable code programmed by one skilled in the art to perform the method and workflow steps or functions of FIG. 1, 2, or 6. Accordingly, by executing the computer program instructions, the processor 1304 executes the method and workflow steps or functions of FIG. 1, 2, or 6. Computer 1302 may also include one or more network interfaces 1306 for communicating with other devices via a network. Computer 1302 may also include one or more input/output devices 1308 that enable user interaction with computer 1302 (e.g., display, keyboard, mouse, speakers, buttons, etc.).

Processor 1304 may include both general and special purpose microprocessors, and may be the sole processor or one of multiple processors of computer 1302. Processor 1304 may include one or more central processing units (CPUs), for example. Processor 1304, data storage device 1312, and/or memory 1310 may include, be supplemented by, or incorporated in, one or more application-specific integrated circuits (ASICs) and/or one or more field programmable gate arrays (FPGAs).

Data storage device 1312 and memory 1310 each include a tangible non-transitory computer readable storage medium. Data storage device 1312, and memory 1310, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1308 may include peripherals, such as a printer, scanner, display screen, etc. For example, input/output devices 1308 may include a display device such as a cathode ray tube (CRT) or liquid crystal display (LCD) monitor for displaying information to the user, a keyboard, and a pointing device such as a mouse or a trackball by which the user can provide input to computer 1302.

An image acquisition device 1314 can be connected to the computer 1302 to input image data (e.g., medical images) to the computer 1302. It is possible to implement the image acquisition device 1314 and the computer 1302 as one device. It is also possible that the image acquisition device 1314 and the computer 1302 communicate wirelessly through a network. In a possible embodiment, the computer 1302 can be located remotely with respect to the image acquisition device 1314.

Any or all of the systems and apparatus discussed herein may be implemented using one or more computers such as computer 1302.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving an input medical image of vessels of a patient;
identifying anatomical landmarks in the input medical image;
determining a centerline of the vessels in the input medical image based on the anatomical landmarks;
generating a probabilistic tree of the vessels based on a probability of fit of the anatomical landmarks and the centerline of the vessels; and
outputting the probabilistic tree of the vessels.

2. The method of claim 1, wherein determining a centerline of the vessels in the input medical image based on the anatomical landmarks comprises generating a centerline probability map of the centerline of the vessels and wherein generating a probabilistic tree of the vessels based on a probability of fit of the anatomical landmarks and the centerline of the vessels comprises:
extracting centerline segments from the centerline probability map;
generating candidate mappings between the centerline segments and anatomical landmarks to the probabilistic tree;
calculating a score for each candidate mapping based on a probability of detection of the anatomical landmarks and the centerline segments and a probability of location of the anatomical landmarks and the centerline segments; and
selecting one of the candidate mappings based on the scores.

3. The method of claim 1, wherein generating a probabilistic tree of the vessels based on a probability of fit of the anatomical landmarks and the centerline of the vessels comprises:
determining paths between the anatomical landmarks using RL (reinforcement learning) agents; and
generating the probabilistic tree based on a likelihood of the paths.

4. The method of claim 3, wherein each of the RL agents is trained to navigate to a respective anatomical landmark based on geometric features and local image context features of the input medical image and wherein one or more of the RL agents share the geometric features and the local image context features with connected RL agents.

5. The method of claim 4, further comprising:
determining an order for running the RL agents using a meta-agent based on a configuration of the RL agents.

6. The method of claim 1, further comprising:
segmenting the vessels from the input medical image based on the centerline of the vessels; and
computing geometric indices of the vessels based on the segmented vessels.

7. The method of claim 1, further comprising:
detecting a location of a large vessel occlusion by identifying discontinuities in the probabilistic tree that result in missing downstream segments.

8. The method of claim 1, wherein identifying anatomical landmarks in the input medical image comprises:
identifying the anatomical landmarks in the input medical image using RL (reinforcement learning) agents, each of the RL agents is trained to navigate to a respective anatomical landmark based on geometric features and local image context features of the input medical image and wherein one or more of the RL agents share the geometric features and the local image context features with connected RL agents.

9. The method of claim 8, wherein the geometric features comprise one or more of relative position, relative distance, relative angle, current agent location confidence, or embedded image intensity features.

10. An apparatus comprising:
means for receiving an input medical image of vessels of a patient;
means for identifying anatomical landmarks in the input medical image;
means for determining a centerline of the vessels in the input medical image based on the anatomical landmarks;
means for generating a probabilistic tree of the vessels based on a probability of fit of the anatomical landmarks and the centerline of the vessels; and
means for outputting the probabilistic tree of the vessels.

11. The apparatus of claim 10, wherein the means for determining a centerline of the vessels in the input medical image based on the anatomical landmarks comprises generating a centerline probability map of the centerline of the vessels and wherein the means for generating a probabilistic tree of the vessels based on a probability of fit of the anatomical landmarks and the centerline of the vessels comprises:
means for extracting centerline segments from the centerline probability map;
means for generating candidate mappings between the centerline segments and anatomical landmarks to the probabilistic tree;
means for calculating a score for each candidate mapping based on a probability of detection of the anatomical landmarks and the centerline segments and a probability of location of the anatomical landmarks and the centerline segments; and
means for selecting one of the candidate mappings based on the scores.

12. The apparatus of claim 10, wherein the means for generating a probabilistic tree of the vessels based on a probability of fit of the anatomical landmarks and the centerline of the vessels comprises:
means for determining paths between the anatomical landmarks using RL (reinforcement learning) agents; and
means for generating the probabilistic tree based on a likelihood of the paths.

13. The apparatus of claim 12, wherein each of the RL agents is trained to navigate to a respective anatomical landmark based on geometric features and local image context features of the input medical image and wherein one or more of the RL agents share the geometric features and the local image context features with connected RL agents.

14. The apparatus of claim 13, further comprising:
means for determining an order for running the RL agents using a meta-agent based on a configuration of the RL agents.

15. A non-transitory computer readable medium storing computer program instructions, the computer program instructions when executed by a processor cause the processor to perform operations comprising:
receiving an input medical image of vessels of a patient;
identifying anatomical landmarks in the input medical image;
determining a centerline of the vessels in the input medical image based on the anatomical landmarks;
generating a probabilistic tree of the vessels based on a probability of fit of the anatomical landmarks and the centerline of the vessels; and
outputting the probabilistic tree of the vessels.

16. The non-transitory computer readable medium of claim 15, wherein determining a centerline of the vessels in the input medical image based on the anatomical landmarks comprises generating a centerline probability map of the centerline of the vessels and wherein generating a probabilistic tree of the vessels based on a probability of fit of the anatomical landmarks and the centerline of the vessels comprises:
extracting centerline segments from the centerline probability map;
generating candidate mappings between the centerline segments and anatomical landmarks to the probabilistic tree;
calculating a score for each candidate mapping based on a probability of detection of the anatomical landmarks and the centerline segments and a probability of location of the anatomical landmarks and the centerline segments; and
selecting one of the candidate mappings based on the scores.

17. The non-transitory computer readable medium of claim 15, the operations further comprising:
segmenting the vessels from the input medical image based on the centerline of the vessels; and
computing geometric indices of the vessels based on the segmented vessels.

18. The non-transitory computer readable medium of claim 15, the operations further comprising:
detecting a location of a large vessel occlusion by identifying discontinuities in the probabilistic tree that result in missing downstream segments.

19. The non-transitory computer readable medium of claim 15, wherein identifying anatomical landmarks in the input medical image comprises:
identifying the anatomical landmarks in the input medical image using RL (reinforcement learning) agents, each of the RL agents is trained to navigate to a respective anatomical landmark based on geometric features and local image context features of the input medical image and wherein one or more of the RL agents share the geometric features and the local image context features with connected RL agents.

20. The non-transitory computer readable medium of claim 19, wherein the geometric features comprise one or more of relative position, relative distance, relative angle, current agent location confidence, or embedded image intensity features.

* * * * *